United States Patent [19]

Siegfried, II

[11] Patent Number: 4,803,667

[45] Date of Patent: Feb. 7, 1989

[54] TELEVIEWER PROCESSING SYSTEM

[75] Inventor: Robert W. Siegfried, II, Frisco, Tex.

[73] Assignee: Atlantic Richfield Company, Los Angeles, Calif.

[21] Appl. No.: 930,169

[22] Filed: Nov. 13, 1986

[51] Int. Cl.[4] .............................................. G01V 1/28
[52] U.S. Cl. ....................................... 367/69; 367/35; 181/105
[58] Field of Search ...................... 367/25, 69, 27, 70, 367/35, 73, 110, 911; 181/106, 105; 346/33 UL, 46; 364/422, 151; 342/181; 33/302, 303; 340/701, 703

[56] References Cited

U.S. PATENT DOCUMENTS

| | | | |
|---|---|---|---|
| 3,134,975 | 5/1964 | Goodman | 342/181 X |
| 3,503,038 | 3/1970 | Baldwin | 367/25 |
| 3,590,940 | 7/1971 | Leger | 367/35 X |
| 3,668,619 | 6/1972 | Dennis | 367/70 X |
| 4,279,026 | 7/1981 | Lambright et al. | 367/70 |
| 4,463,378 | 7/1984 | Rambow | 358/112 |
| 4,467,461 | 8/1984 | Rice | 367/70 |
| 4,542,488 | 9/1985 | Clishem et al. | 367/69 X |
| 4,736,348 | 4/1988 | Bednarczyk | 367/69 |

FOREIGN PATENT DOCUMENTS

| | | | |
|---|---|---|---|
| 0089892 | 9/1983 | European Pat. Off. | 367/35 |
| 0641375 | 1/1979 | U.S.S.R. | 367/25 |

OTHER PUBLICATIONS

"Interpretation and Application of Borehole Televiewer Surveys", T. J. Tayler, SPWLA 24th Annular logging Symposium, Jun. 27–30, 1983.

"Determination of Borehole Shape by Inversion of Teleview Data" Peter Lyone, May–Jun. 1986, *Log Analyst*.

Georgi, Daniel T. "Geometrical Aspects of Borehole Televiewer Images", SPWLA Twenty–Sixth Annual Logging Symposium, Jun. 17–20, 1985.

*Primary Examiner*—Thomas H. Tarcza
*Assistant Examiner*—Tod R. Swann
*Attorney, Agent, or Firm*—Robert D. Lott

[57] ABSTRACT

Data received from a sonde in a borehole is enhanced by first measuring the relative travel time of a signal transmitted from the sonde and reflected from an area in the wall of a borehole. This measurement is repeated for a plurality of angles in a horizontal plane. From this plurality of travel times a best fit ellipse or circle is calculated and the travel times are correlated with the best fit ellipse or circle to provide corrected travel times and to determine the eccentricity of the sonde in the borehole. The corrected travel times are displayed as images to indicate the detailed shape properties of the borehole.

8 Claims, 3 Drawing Sheets

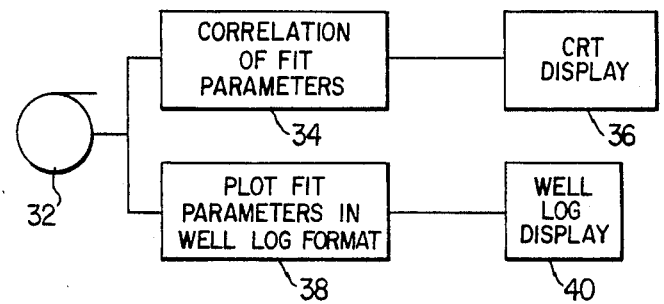
FIG. 4
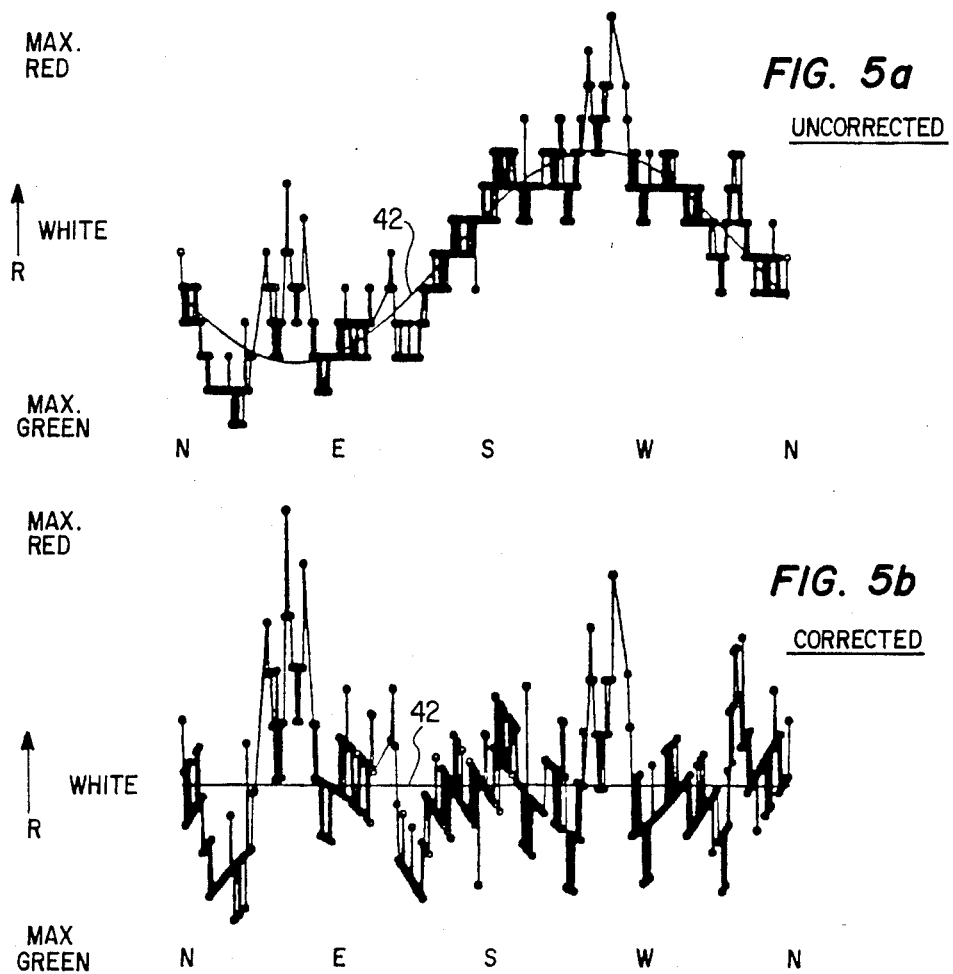
FIG. 5a UNCORRECTED
FIG. 5b CORRECTED

TELEVIEWER PROCESSING SYSTEM

TECHNICAL FIELD

This invention relates to borehole logging systems, and more particularly to processing systems for televiewer sondes.

BACKGROUND OF THE INVENTION

Certain present borehole televiewer tools or sondes provide detailed acoustic sensing of the wall of the borehole through the use of sonic transmitters and receivers. Such sondes provide the travel times of an acoustic pulse and the relative amplitude of the reflected acoustic pulse. In addition, the sonde provides a relative reference of the sonde in the borehole with respect to the north pole. From this data, images of the borehole wall may be constructed based on either the acoustic reflectivity of the borehole wall or the distance from the televiewer sonde to the borehole wall. Such images typically reveal information regarding the texture and shape of the borehole wall, and features such as fractures and bedding planes which may intersect the borehole.

These reflection and travel time images are conventionally digitized and displayed on a digital CRT, where variation in color or gray scale correspond to changes in reflectivity or travel time. Unfortunately, the travel time image display dynamic range is often saturated by variations in the sonde-to-borehole wall distance brought about by slight eccentricity of the sonde within the borehole. Or stated another way, if the sonde is not in the center of the borehole, but rather closer to one wall, the differences in travel time caused by differences in shape of the borehole wall tend to be obscured by the differences caused by the location of the sonde with respect to the center of the borehole. This renders detection of small variations in borehole wall topography or ellipticity difficult to detect. Further, a detailed comparison between reflectance and travel time data is difficult when there is marked eccentricity. Also, the borehole ellipticity (which is related to in situ stress fields) is difficult to quantify from such an image.

It can, therefore, be appreciated that a method to determine the eccentricity of the sonde within the borehole and to correct the travel time data to compensate for such an eccentricity is highly desirable.

SUMMARY OF THE INVENTION

It is, therefore, an object of the present invention to provide a method for measuring the eccentricity of a sonde within a borehole.

It is also an object of the present invention to provide a method for quantifying the ellipticity of a borehole and the relative position of the sonde within the borehole.

It is a further object of the this invention to correct the travel time data from the sonde for variations caused by the eccentricity of the sonde within the borehole.

As shown in an illustrated embodiment of the invention, the data received from a sonde in a borehole is enhanced by first measuring the relative travel time of a signal transmitted from the sonde and reflected from an area in the wall of a borehole. This measurement is repeated for a plurality of angles in a horizontal plane. From this plurality of travel times a best fit ellipse or circle is calculated and the travel times are correlated with the best fit ellipse or circle to provide corrected travel times and to determine the eccentricity of the sonde in the borehole. The corrected travel times are displayed as images to indicate the detailed shaped properties of the borehole.

BRIEF DESCRIPTION OF THE DRAWINGS

The aforementioned, other features, characteristics, advantages, and the invention in general, will be better understood from the following more detailed description taken in conjunction with the accompanying drawings in which

FIG. 4 is a block diagram of a display system for providing an image of the corrected televiewer data;

FIG. 5 is a graphical representation of the sonde relative travel time and of the sonde corrected travel time;

Figure 1:
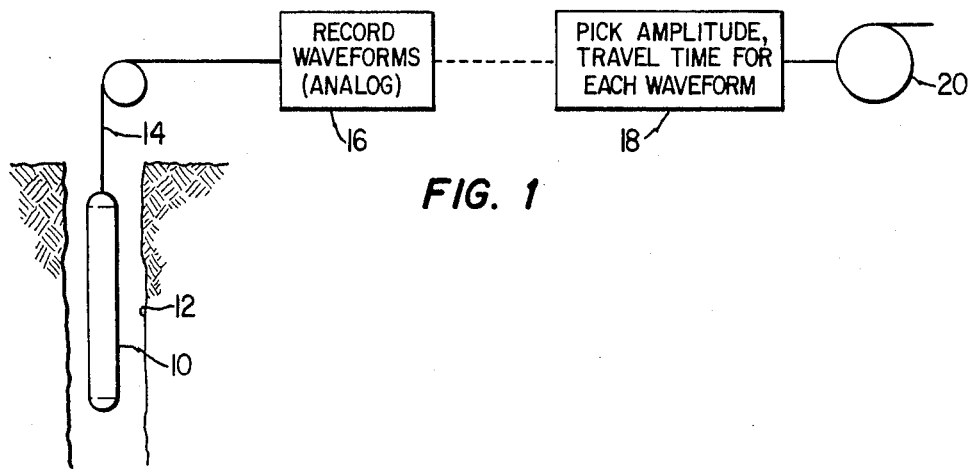
FIG. 1 is a block diagram of the data acquisition of the borehole data.

It will be appreciated that for simplicity and clarity, reference numerals have been repeated as considered appropriate in the figures to indicate corresponding features.

DETAILED DESCRIPTION OF THE PREFERRED EMBODIMENT

Turning now to the drawings, FIG. 1 is a block diagram of a data acquisition system for acquiring the raw data used in the present invention. Shown in FIG. 1, a downhole sonde 10 is lowered into a borehole 12 by means of cable 14. The sonde 10 contains an acoustic transmitter and receiver (which may be combined into a single transducer) and is able to transmit acoustic signals from the sonde onto the borehole wall and receive and discriminate a reflected acoustic signal. The transmitter and receiver are rotatable in a horizontal plane. The sonde 10 provides, through cable 14, the output from the acoustic receiver in the sonde and also an indication of the angle of the transmitter and receiver with respect to a reference point in the horizontal plane. Thus, the receiver output together with the angle reference can be used to determine the travel time of the acoustic pulse and the magnitude of the reflected acoustic pulse for discrete angles of the transmitter/receiver, in which angles are referenced to a reference point in the horizontal plane, usually the north pole.

The signals from the receiver and the angular position of the transmitter/receiver are coupled through cable 14 to an analog recorder 16. The analog recorder 16 may use either conventional scientific analog tape or alternatively may use video tape as a recording medium. In either event, the recorded analog signal is played back at a later date, and the signals recorded thereon are coupled into a selective analog-to-digital converter 18 which digitizes the amplitude, travel time, and reference angle for each of the discrete transmit/receive operations of the sonde 10. This digitized data is then recorded onto a digital tape shown as element 20 which is preferably shipped off site to a well logging laboratory area.

Figure 2:
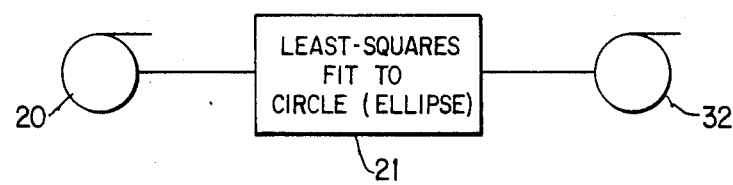
FIG. 2 is a block diagram of the apparatus to provide an eccentricity fit of the televiewer data.

The digital tape 20 from the data acquisition of FIG. 1 is then processed to correct the data for eccentricity in the manner shown in the block diagram of FIG. 2. The eccentricity fit, i.e., taking the travel time data for one rotation and fitting it to a circle, or the ellipticity fit, which is taking the travel times for one rotation and fitting to an ellipse, is accomplished by reading the travel times for one rotation from the tape 20 and using a least squares algorithm to fit the travel times to a circle or to an ellipse.

Figure 3:
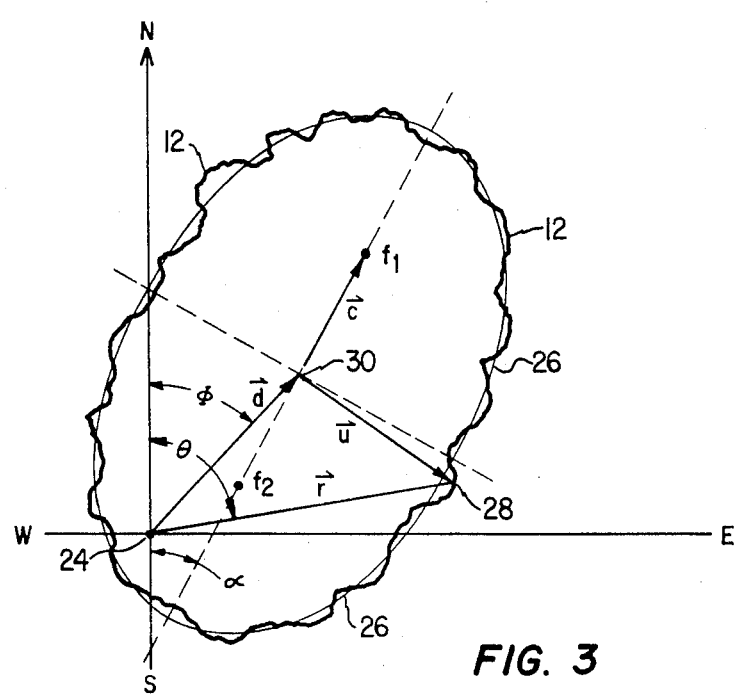
FIG. 3 is a cross-section representation of a borehole showing the relative location of the sonde.

The fitting process can be better understood with reference to FIG. 3 which shows a plan view of a cross section of the borehole 12 in which the center 24 of the sonde 10 is located in the lower left-hand corner of the borehole 12. Also shown in FIG. 3 is the geometry involved in fitting an ellipse 26 to the borehole 12. The elliptical fit process of the present invention uses a coordinate system whose origin lies on the center 24 of the sonde 10. The parameters used in the fitting process are defined below, along with the polar coordinate representation of the vector quantities:

$\vec{r} = (r, \theta)$: Vector from the sonde 10 to a point on the borehole wall 28.

$\vec{d} = (d, \phi)$: Vector from the sonde 10 to center 30 of borehole 12.

$\vec{u} = \vec{r} - \vec{d} = (u, \beta)$: Vector from the center 30 of the borehole 12 to the point 28 on the borehole wall specified by r. For a circular borehole, u is the borehole radius.

$\vec{c} = (c, \gamma)$: Vector from the center 30 of the borehole 12 to one of the foci f1 of the elliptical borehole cross section. For a circular borehole, c=0.

a: Length of the semi-major axis of the ellipse 26 defining the borehole cross section. For a circular borehole, $a = r_o$.

$r_o$: Radius of a circular borehole, or mean radius of an elliptical borehole.

An ellipse may be defined as the locus of points for which the sum of the distances of a point from any two fixed points (the foci) is a constant, or referring to FIG. 3:

$$|\vec{r} - \vec{d} + \vec{c}| + |\vec{r} - \vec{d} - \vec{c}| = 2a \tag{1}$$

It is advantageous to express $r(=|\vec{r}|)$ as a function of azimuth angle ($\theta$) based on this relationship. If $\vec{u}$ is defined as $$\vec{u} = \vec{r} - \vec{d}, \tag{2}$$

the formulae for expressing the sum of two vectors in polar coordinates may be written as $$u^2 = r^2 + d^2 - 2rd \cos(\theta - \phi) \tag{3}$$

$$\tan\beta = \frac{\sin\theta - \frac{d}{r}\sin\phi}{\cos\theta - \frac{d}{r}\cos\phi} \tag{4}$$

Solving equation (3) for r using the quadratic formula yields:

$$r = d \cos(\theta - \phi) + u \left\{ 1 + \left(\frac{d}{u}\right)^2 [\cos^2(\theta - \phi) - 1] \right\}^{\frac{1}{2}} \tag{5}$$

If it is assumed that the tool is displaced only slightly from the center of the borehole, relative to the borehole dimensions (d<<u), equation (5) becomes $$r \approx u + d \cos(\theta - \phi). \tag{6}$$

Note that for a circular borehole (c=0), equation (1) reduces to:

$$|\vec{u}| = u = a. \tag{7}$$

The parameter a is now the radius of the circular borehole ($r_o$), and equation (6) reduces to:

$$r \approx r_o + d \cos(\theta - \phi). \tag{8}$$

If the borehole is not circular, u must still be expressed as a function of azimuth angle. Equation (1) may be written:

$$|\vec{u} + \vec{c}| + |\vec{u} - \vec{c}| = 2a; \text{ or} \tag{9}$$

Subtracting $2|\vec{u} - \vec{c}|$ from each side yields:

$$|\vec{u} + \vec{c}| - |\vec{u} - \vec{c}| = 2a - 2|\vec{u} - \vec{c}|. \tag{10}$$

Multiplying (9) and (10), provides $$|\vec{u} + \vec{c}|^2 - |\vec{u} - \vec{c}|^2 = 4a^2 - 4a|\vec{u} - \vec{c}|. \tag{11}$$

Using the formula for the modulus of the sum of two vectors expressed in polar coordinates and collecting terms yields:

$$uc \cos(\beta - \gamma) = a^2 - a[u^2 + c^2 - 2uc \cos(\beta - \gamma)]^{\frac{1}{2}}, \tag{12}$$

or $$\frac{a^2 - uc \cos(\beta - \gamma)}{a} = [u^2 + c^2 - 2uc \cos(\beta - \gamma)]^{\frac{1}{2}} \tag{13}$$

Squaring and collecting terms:

$$u^2 \left[ 1 - \left(\frac{c}{a}\right)^2 \cos^2(\beta - \gamma) \right] = a^2 - c^2, \tag{14}$$

or $$u = a \left[ \frac{1 - \left(\frac{c}{a}\right)^2}{1 - \left(\frac{c}{a}\right)^2 \cos^2(\beta - \gamma)} \right]^{\frac{1}{2}} \tag{15}$$

If the ellipticity of the borehole is small (c<<a), equation (15) may be simplified:

$$u \approx a \left\{ \left[ 1 - \left(\frac{c}{a}\right)^2 \right] \left[ 1 + \left(\frac{c}{a}\right)^2 \cos^2(\beta - \gamma) \right] \right\}^{\frac{1}{2}}, \tag{16}$$

or $$u \approx a \left\{ 1 + \frac{1}{2} \left(\frac{c}{a}\right)^2 [\cos^2(\beta - \gamma) - 1] + \tag{17}$$

-continued $$\frac{1}{2}\left(\frac{c}{a}\right)^4 \cos^2(\beta-\gamma)\right\}$$

Dropping the $(c/a)^4$ term and using the trigonometric identity $\cos 2\theta = 2\cos^2\theta - 1$:

$$u \approx a[1 - \tfrac{1}{4}(c/a)^2 + \tfrac{1}{4}(c/a)^2 \cos 2(\beta-\gamma)]. \quad (18)$$

By defining the following parameters:

$$e = \tfrac{1}{4}(c/a)^2 \quad (19)$$

$$r_o = a(1-e) \quad (20)$$

$$k = ae, \quad (21)$$

equation (18) becomes $$u \approx r_o + k \cos 2(\beta-\gamma). \quad (22)$$

Substituting this expression into equation (6) yields:

$$r \approx r_o + d\cos(\theta-\phi) + k\cos 2(\beta-\gamma). \quad (23)$$

From equation (4), if $d << r$:

$$\tan\beta \approx \tan\theta, \quad (24)$$

or $$\beta \approx \theta. \quad (25)$$

Thus, equation (5) becomes $$r \approx r_o + d\cos(\theta-\phi) + k\cos 2(\theta-\gamma) \quad (26)$$

where $c << a$, $d << u$, and $d << r$. The conditions on c and d require low borehole ellipticity and tool eccentricity relative to borehole dimensions. In practice, this condition is always well satisfied, since if eccentricity or ellipticity is not minimal, insufficient data for characterizing borehole shape is acquired. This is due to the need for a near normal incidence reflecting surface at the borehole wall imposed by the narrow beam width of the transducer.

Note that equation (26) may be viewed as the first three terms in a Fourier series expansion of the borehole cross-sectional shape. This suggests that if appropriate techniques are developed for handling the often sparse and irregularly distributed travel time data generated by the televiewer, Fourier analysis may result in improved methods for the calculation of these three parameters as well as higher order terms in the borehole shape expansion. Such high order terms may be expected to yield additional information with respect to the interpretation of borehole shape in terms of the physical processes that are now active or have been active in the past in the material surrounding the borehole.

In practicing the present invention, an assumption is made that the borehole 12 is either generally elliptical in shape or circular in shape. While a circle is a specific type of ellipse, the number of computations, and therefore the amount of computer time, needed to provide a best fit circle is considerably less than the amount of computing time needed to provide a best fit ellipse. This practical consideration, combined with the fact that most boreholes are generally circular in nature, has resulted in the use of circular approximations for most applications of the present invention. However, in cases where a specific area is be viewed in detail and where it is believed that the borehole may be elliptical due to stress fields in the formation, the elliptical fit may be used. Also, as computing power increases to a sufficient amount, an elliptical fit may be used as a general procedure.

Once an ellipse or a circle has been assumed for the general borehole shape, the equations above are used to generate a series of ellipses or circles respectively, in an iterative manner in order to arrive at the ellipse or circle which minimizes the mean square error between the best fit circle or ellipse and the actual data. Such least squared approximations are well known in mathematics and are explained in such publications as Bevington, Philip R., *Data Reduction and Error Analysis for the Physical Sciences,* 1969, McGraw-Hill Book Company, New York, N.Y.

Once the best fit ellipse or circle has been calculated for each horizontal section of the borehole 12, the best fit parameters together with the travel time are recorded onto another digital tape 32 shown in FIG. 2, along with the original data. The fit parameters in the preferred embodiment are the $r_o$, d, k, $\phi$ and $\gamma$ parameters shown in equation (26) for an ellipse and the $r_o$, d, and $\phi$ parameters shown in equation (8) for a circle.

The correlation process follows the process of determining the fit parameters. In the correlation process the fit parameters describing the best fit ellipse or circle are correlated with the travel times to cause the travel times to be adjusted to compensate for the eccentricity of the sonde in the borehole. In other words, the travel times are adjusted so that the corrected travel times are the travel times which would have been detected by the sonde 10 if it had been located in the center of the borehole 12. In the preferred embodiment, this correlation process occurs during the display process as described below in the discussion relating to FIG. 4. However, as an alternative embodiment, the correlation process can be performed in conjunction with the generation of the fit parameters as described above with respect to FIG. 2. In this alternative the corrected travel times would be recorded on the digital tape 32.

Once the fit parameters have been determined, the data with the fit parameters are used to display the borehole data in the manner shown in the block diagram of FIG. 4. As shown in FIG. 4 the digital tape 32 containing the uncorrected travel time data is correlated with the fit parameters in a processor 34 in the manner described above. These corrected travel times are then coupled into a CRT display unit 36 which displays a color image of the deviations of the corrected travel times to the best fit ellipse or circle.

The CRT display 36 consists, in the preferred embodiment, of a graphical representation in which the inside of the borehole wall is essentially laid flat with the horizontal axis representing the horizontal orientation of each portion of the borehole wall and the vertical axis representing the depth of each horizontal plane within the borehole. A plurality of these horizontal planes are grouped together to form a profile of a portion of the borehole. The relative travel times are indicated in the CRT by the color and intensity of the color of each portion of the borehole. By convention, the travel times which are equal to the radius or which represent points falling exactly on the best fit ellipse are shown in white. Travel times which are longer than the radius of the circle or which fall beyond the ellipse are shown as red, and conversely travel times which are shorter than the radius or which fall inside the ellipse are shown as green. The relative deviations of these travel times from the radius or the position of the ellipse is shown by the intensity of the color in which the longest travel time for all of the horizontal planes chosen for a particular image is shown as the most intense red, and the shortest travel time is shown a the most intense green. The other travel times are shown as proportionally less intense red or green colors. The CRT display can also be made into a photographic image.

Besides the relative travel times, the reflectance magnitude is also generally shown in the CRT display beside the travel time display using the same type of coordinates as the travel time coordinate system. Advantageously, the fit parameters may also be displayed to show the eccentricity of the sonde 10 within the borehole 12, the diameter of the borehole, including the variability of the radius of the borehole as a function of the depth of the sonde, and the degree and orientation of the ellipticity of the borehole. These fit parameters may in addition also be combined with other well logging parameters in block 38 and displayed along with other such well logging parameters in the display unit shown in block 40. In this manner the fit parameters provide other useful data to the scientists analyzing the conventional well logging data.

The main advantage of using the elliptical or circular fit is shown in FIGS. 5 and 6. FIG. 5A is a graphical representation of the uncorrected travel times, and the corrected travel times are shown in FIG. 5B. The horizontal axis in FIGS. 5A and 5B is the angular orientation of each of the travel times from the sonde in its original position in the borehole 12. In both FIGS. 5A and 5B the relative amplitudes of the travel times have been proportioned so that the maximum positive amplitude produces a maximum red color on the display and the minimum travel times produces a maximum green color on the display. Also in FIGS. 5A and 5B a line corresponding to the best fit circle 42 has been superimposed on the travel times.

The line corresponding to the best fit circle 42 in FIG. 5A is essentially sinusoidal indicating that the sonde 10 is not centrally located in the borehole 12. For the corrected travel times shown in FIG. 5B the line corresponding to circle 42 is straight, indicating that the correlation process "moves" the center of the sonde 10 to the center of the borehole 12.

Figure 6B:
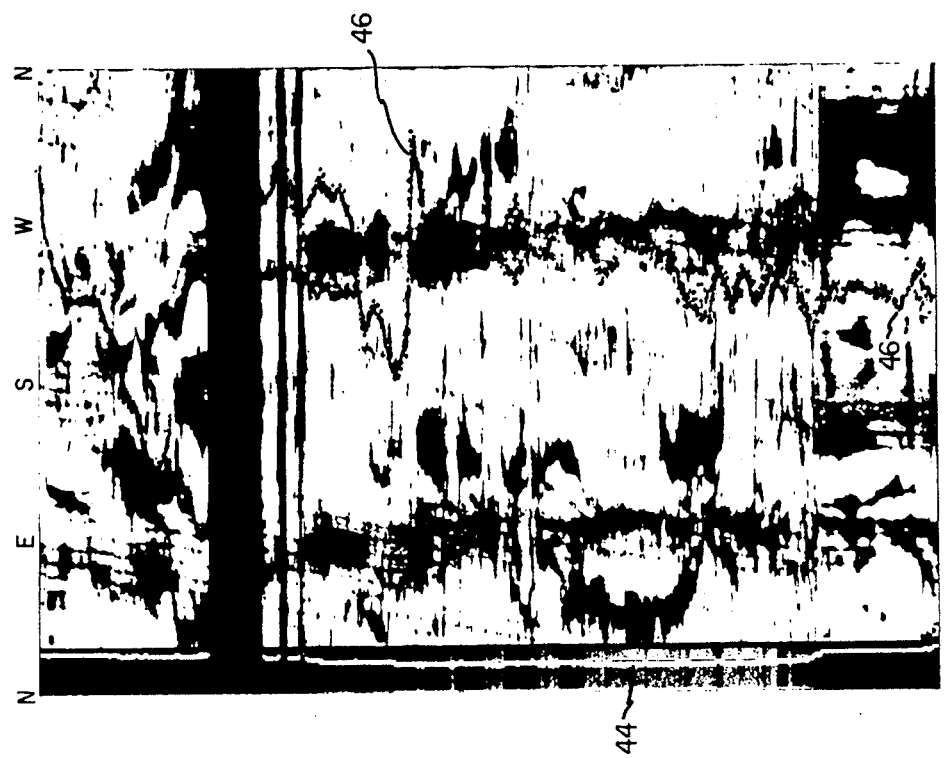
FIG. 6 is an image produced by the display of FIG. 5 showing a plurality of horizontal sections of a borehole showing the relative corrected travel times.
Figure 6A:

FIG. 6A is the resulting CRT display image (in black and white) provided by the uncorrected travel times, and the CRT display image for the corrected travel times is shown in FIG. 6B. For simplicity, the color CRT display has been converted to a black and white display in FIGS. 6A and 6B. In the normal color display, a deep green color is used to indicate the minimal travel times and the deep red color is used to indicate the maximum travel times, with white being used to indicate the average travel times. In the black and white displays shown in FIGS. 6A and 6B, the minimum travel times are shown by a white area and the maximum travel times are shown by a dark area, while the average travel times are shown by a gray area. Areas of total blackness are areas in which there was no acoustic return pulse detectable by the receiver in the sonde 10. An examination of FIG. 6A shows that the minimum travel times are predominately along the east side of the borehole and the longest travel times are on the west side of the borehole. However, when the relative travel times are corrected to compensate for the eccentricity of the sonde in the borehole, (FIG. 6B) it becomes clear that the borehole is essentially elliptical in nature with the north and south walls of the borehole closer to the center than the east and west walls.

Also shown in FIG. 6B is the average radius of the borehole, one of the fit parameters, shown as a function of the depth of the borehole, as indicated by element number 44. This relative radius trace then provides a visual caliper of the average radius of the borehole as a function of depth of the hole. Also superimposed in FIG. 6B is a trace 46 indicating the portion of the borehole from which the sonde 10 is farthest as it moves through the borehole. This trace 46 is also calculated from the fit parameters described above. Thus in FIG. 6B, the sonde is generally farthest from the west wall which correlates with the display image for the uncorrected travel time data shown in FIG. 6A.

Thus, the images produced by the corrected travel time as shown in FIG. 5B and FIG. 6B indicate much more precise deviations of the wall of the borehole and provide a detailed contour of the borehole wall in which small deviations in the borehole wall are not swamped or buried by the eccentricity of the sonde 10 within the borehole 12. Thus, the use of the present invention provides much greater detailed analysis of the contour of the borehole than methods which do not account or compensate for the eccentricity of the sonde 10 and the borehole 12.

While the invention has been described in part, by making detailed reference to a specific embodiment, such detail is intended to be, and will be understood, to be instructive rather than restrictive. It will be appreciated by those in the art that many variations can be made in the structure and mode of operation without departing from the spirit and scope of the invention and disclosed in the teachings contained herein. For example, the magnitude of the reflected acoustic signals could be adjusted depending on the distance between the sonde and the borehole wall and also on the relative angle of incidence and reflection between the sonde and the borehole wall.

What is claimed is:

1. A method of displaying the detailed contour of a borehole comprising the steps of:
    (a) measuring, for a plurality of angles in a horizontal plane with respect to a horizontal reference point, the relative travel time of a signal transmitted from a sonde in said borehole, reflected by an area in the wall of said borehole and received by said sonde;
    (b) calculating a best fit ellipse from said relative travel times;
    (c) correlating said relative travel times with said best fit ellipse to provide corrected travel times; and
    (d) displaying said corrected travel times so as to indicate said detailed contour of said borehole.

2. The method set forth in claim 1 further including the step of calculating the location on the sonde relative to the center of said borehole, the degree and orientation of ellipticity of said borehole and the variability of the radius of said borehole as a function of the depth of the sonde.

3. The method set forth in claim 1 wherein said step of correlating said relative travel times with said best fit ellipse provides a set of fit parameters which define said ellipse and the location of said sonde with respect to said ellipse.

4. The method set forth in claim 1 wherein said method of displaying said corrected travel times comprises the steps of:
  (a) establishing the position of said ellipse as a zero reference point and selecting a first color to represent said zero reference point;
  (b) establishing a maximum positive excursion and a maximum negative excursion for said corrected travel times for a plurality of horizontal planes that are to be displayed at one time;
  (c) selecting a second color to represent positive excursion and an intensity of said second color to represent said maximum positive excursion with positive excursions less than said maximum positive excursion represented by said second color at an intensity level less than that selected for the maximum positive excursion; and
  (d) selecting a third color to represent negative excursions and selecting an intensity level of said third color to represent said maximum negative excursion with negative excursions less than said maximum negative excursion represented by said third color at an intensity level less than said brightness level selected for displaying said maximum negative excursion.

5. A method of displaying the contour of a borehole comprising the steps of:
  (a) measuring, for a plurality of angles in a horizontal plane with respect to a horizontal reference point, the relative travel time of a signal transmitted from a sonde in said borehole, reflected by an area in the wall of said borehole and received by said sonde;
  (b) calculating a best fit circle from said relative travel times;
  (c) correlating said relative travel times with said best fit circle to provide corrected travel times; and
  (d) displaying said corrected travel times so as to indicate the detailed shape properties of said borehole.

6. The method set forth in claim 5 further including the step of calculating the location of the sonde relative to the center of said borehole.

7. The method set forth in claim 6 wherein said step of correlating said relative travel times with said best fit circle provides a set of fit parameters which define said circle and the location of said sonde with respect to said circle.

8. The method set forth in claim 6 wherein said method of displaying said corrected travel times comprises the steps of:
  (a) establishing the position of said circle as a zero reference point and selecting a first color to represent said zero reference point;
  (b) establishing a maximum positive excursion and a maximum negative excursion for said corrected travel times for a plurality of horizontal planes that are to be displayed at one time;
  (c) selecting a second color to represent positive excursion and an intensity of said second color to represent said maximum positive excursion with positive excursions less than said maximum positive excursion represented by said second color at an intensity level less than that selected for the maximum positive excursion; and
  (d) selecting a third color to represent negative excursions and selecting an intensity level of said third color to represent said maximum negative excursion with negative excursions less than said maximum negative excursion represented by said third color at intensity level less than said brightness level selected for displaying said maximum negative excursion.

* * * * *